(12) United States Patent
Buchstab

(10) Patent No.: US 9,230,448 B2
(45) Date of Patent: Jan. 5, 2016

(54) FLIGHT SIMULATOR DEVICE

(71) Applicant: KUKA Roboter GmbH, Augsburg (DE)

(72) Inventor: Alois Buchstab, Stadtbergen (DE)

(73) Assignee: KUKA Roboter GmbH, Augsburg (DE)

( * ) Notice: Subject to any disclaimer, the term of this patent is extended or adjusted under 35 U.S.C. 154(b) by 69 days.

(21) Appl. No.: 13/753,940

(22) Filed: Jan. 30, 2013

(65) Prior Publication Data

US 2013/0203020 A1 Aug. 8, 2013

(30) Foreign Application Priority Data

Feb. 7, 2012 (DE) .......................... 10 2012 201 772

(51) Int. Cl.
| | |
|---|---|
| *G09B 19/16* | (2006.01) |
| *G09B 9/12* | (2006.01) |
| *G09B 9/46* | (2006.01) |
| *B25J 5/00* | (2006.01) |
| *B25J 11/00* | (2006.01) |

(52) U.S. Cl.
CPC .............. *G09B 19/165* (2013.01); *B25J 5/007* (2013.01); *B25J 11/00* (2013.01); *G09B 9/12* (2013.01); *G09B 9/46* (2013.01)

(58) Field of Classification Search
CPC .......... G09B 19/167; G09B 9/05; G09B 9/08; G09B 9/12; G09B 9/00; G09B 9/46; G09B 9/14; G09B 9/165; G09B 9/042
See application file for complete search history.

(56) References Cited

U.S. PATENT DOCUMENTS

| | | | |
|---|---|---|---|
| 5,701,966 A | 12/1997 | Amico | |
| 5,791,903 A * | 8/1998 | Feuer et al. | ..................... 434/38 |
| 6,210,164 B1 * | 4/2001 | Otto | ................................. 434/55 |
| 6,488,504 B1 * | 12/2002 | Patterson | ........................ 434/33 |
| 2010/0224427 A1 | 9/2010 | Nuechter et al. | |
| 2011/0039235 A1 * | 2/2011 | Margreiter | ....................... 434/35 |
| 2011/0098855 A1 | 4/2011 | Kurth et al. | |
| 2011/0200974 A1 | 8/2011 | Gluck | |

FOREIGN PATENT DOCUMENTS

| | | |
|---|---|---|
| DE | 1 603 171 A1 | 1/1971 |
| DE | 75 12 610 U | 9/1975 |
| DE | 10 2007 016 662 A1 | 10/2008 |
| DE | 20 2008 010 538 U1 | 10/2008 |
| DE | 10 2008 002 274 A1 | 12/2009 |

(Continued)

OTHER PUBLICATIONS

European Patent Office; Search Report in European Patent Application No. 13153993.4 dated May 16, 2013; 10 pages.
Travis Deyle; Publication entitled "KUKA youBot Robot Unveiled at Automatica: a Mecanum Base With 5 DOF Arm" dated Jun. 11, 2010; 3 pages.
Anonymous; Publication entitled "KUKA youBot Omni-directional Mobile Platform With Arm" dated Dec. 28, 2011; 2 pages.

(Continued)

*Primary Examiner* — Timothy A Musselman
(74) *Attorney, Agent, or Firm* — Wood, Herron & Evans, LLP

(57) ABSTRACT

The invention concerns a flight simulator device (1, 51) for simulating the flight behavior of an aircraft. The flight simulator device (1, 51) comprises a passenger compartment (6) with an input means to accommodate at least one person (P), an omnidirectionally movable carrier vehicle (2) with several wheels (4) and with drive units for driving the wheels (4), and a control device (5) connected to the input means and the drive units of the carrier vehicle (2), which is designed to actuate the drive units of the carrier device (2) on the basis of signals coming from the input means.

12 Claims, 3 Drawing Sheets

(56) References Cited

FOREIGN PATENT DOCUMENTS

Figure 1:
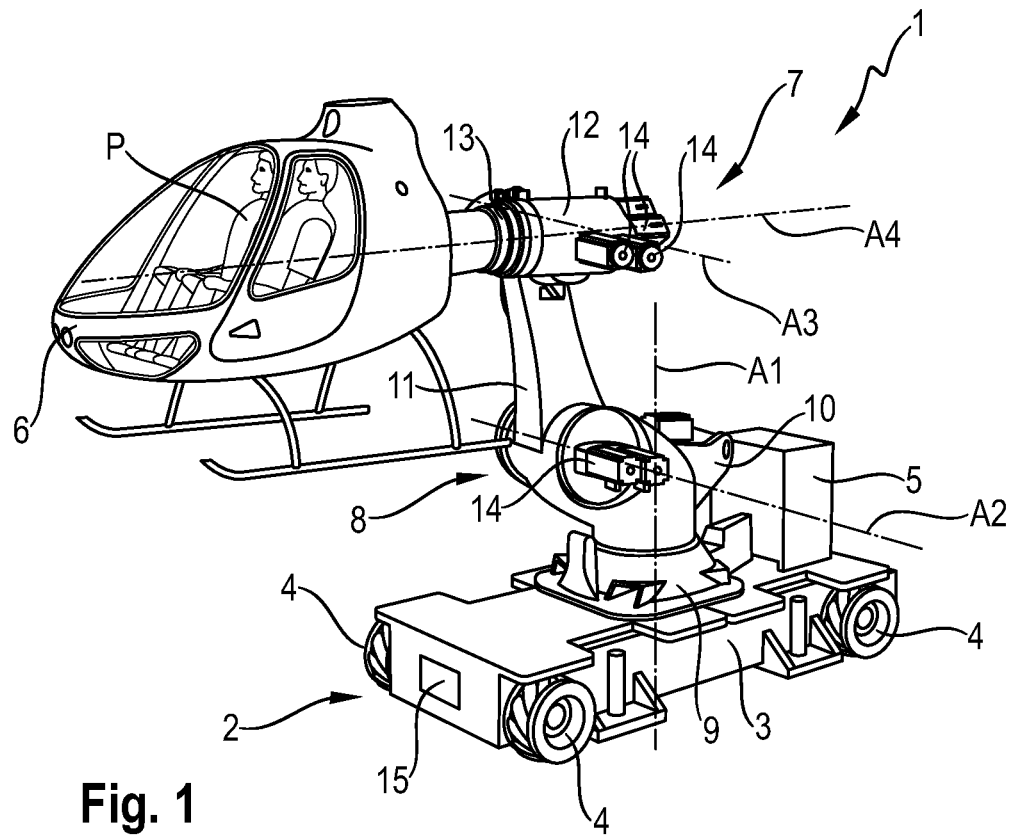

| | | |
|---|---|---|
| DE | 20 2010 011 962 U1 | 11/2010 |
| EP | 0 997 176 A2 | 5/2000 |
| EP | 2363849 A2 | 9/2011 |
| WO | 2005/109375 A1 | 11/2005 |
| WO | 2009089561 A2 | 7/2009 |

OTHER PUBLICATIONS

European Patent Office; Search Report in European Patent Application No. 13153993.4 dated Feb. 21, 2014; 8 pages.

Hizook; Publication entitled "KUKA OmniMove Base and Titan Robot Arm" dated Oct. 31, 2010; 1 page.

German Patent Office; Search Report in German Patent Application No. 10 2012 201 772.0 dated Jul. 10, 2012; 5 pages.

\* cited by examiner

FLIGHT SIMULATOR DEVICE

The invention concerns a flight simulator device, especially a rotary-wing aircraft flight simulator device.

WO 2005/109375 A1 discloses a flight simulator for training purposes. The flight simulator comprises a hexapod with six degrees of freedom, a cabin mounted on the hexapod, and a control device for operating the hexapod, connected to the hexapod.

The problem of the invention is to indicate an improved flight simulator device, especially one for the simulating of a rotary-wing aircraft.

The problem of the invention is solved by a flight simulator device for simulating the flight behavior of an airplane, having
- a passenger compartment with an input means to accommodate at least one person,
- an omnidirectionally movable carrier vehicle with several wheels and with drive systems for driving the wheels, and
- a control device connected to the input means and the drive units of the carrier vehicle, which is designed to actuate the drive units of the carrier device on the basis of signals coming from the input means.

The flight simulator device of the invention is designed to give a person the opportunity to simulate the flight behavior of an airplane. This will make it possible for the person to learn the flight behavior without making use of the airplane being simulated, e.g., for training purposes. The flight simulator device of the invention is especially designed to simulate the flight behavior of rotary-wing aircraft, such as a helicopter.

The simulation device according to the invention comprises the passenger compartment with the input means. The passenger compartment is adapted in particular to the driver's position of the aircraft being simulated, i.e., the input means are adapted to the operating and optionally also to the display means of the aircraft being simulated, which are located in its driver's position and are needed to control the aircraft being simulated. The passenger compartment can also comprise a seat, corresponding to the seat of the driver's position of the aircraft being simulated. In particular, the passenger compartment can be designed as a helicopter cell.

The input means are connected to the control device. On these runs, e.g., a computer program, by means of which the control device evaluates the signals coming from the input means and then actuates the drive units of the carrier vehicle so that the carrier vehicle performs a movement corresponding to the input by means of the input means. In this way, the passenger compartment moves along, being fastened at least indirectly to the carrier vehicle. The drive units of the carrier vehicle are in particular electrical drive units, preferably regulated electrical drive units.

According to the invention, the carrier vehicle is designed as an omnidirectionally movable carrier vehicle. Preferably, therefore, the wheels of the carrier vehicle are configured as omnidirectional wheels. An example of an omnidirectional wheel is the Mecanum wheel, familiar to the skilled person. Thanks to the omnidirectional wheels, the flight simulator device of the invention or its carrier vehicle is able to move freely in space. Thus, the carrier vehicle can not only move forward, backward, or sideways, or travel on curves, but also turn about a vertically oriented axis, for example. In this way, a hovering flight of a rotarywing aircraft, especially a helicopter, can be simulated quite realistically, since the omnidirectionally movable carrier vehicle affords the possibility, through its wheel technology, to mimic all horizontal movements that are required during a hover.

According to one preferred embodiment of the flight simulator device of the invention, it has a device fastened to the carrier vehicle for raising and lowering the passenger compartment, which has a drive unit connected to the control device. The control device is then designed to actuate the drive unit of the device for raising and lowering the passenger compartment based on signals arriving from the input means. By means of this device, one can thus also simulate, e.g., a takeoff and landing of the aircraft being simulated. The device for raising and lowering the passenger compartment comprises, e.g., drive units, especially electrical drive units, preferably regulated electrical drive units.

In order especially to simulate more realistically the flight of a rotary-wing aircraft, especially a helicopter, according to one embodiment of the flight simulator device of the invention its device for raising and lowering the passenger compartment is designed to rotate, to tilt, and/or to swivel the passenger compartment. In this way, one can simulate rolling and pitch movements of the rotary-wing aircraft being simulated.

According to one preferred embodiment of the flight simulator device of the invention, the device for raising and lowering the passenger compartment has a robotic arm, which has several members arranged in succession and drive units connected to the control device for moving the members. The drive units of the robotic arm are in particular electrical drive units, preferably regulated electrical drive units. The robotic aim is, e.g., a robotic arm of a standard industrial robot and it comprises, for example, six degrees of freedom, i.e., six axes of rotation about which the members can turn.

When using such a robotic arm, vertical movements being simulated that are necessary for a simulated takeoff or landing are executed about so-called axes 2 and 3. The simulated rolling and pitching movements are performed, for example, about socalled manual axes.

According to another preferred embodiment of the flight simulator device of the invention, its robotic arm does not have six degrees of freedom, but precisely five degrees of freedom. This robotic arm, in particular, comprises a frame rigidly fastened to the carrier vehicle, a rocker arm, a jib and a robotic hand, especially a multiaxial one. In particular, the rocker arm is mounted on the frame so that it can swivel about a horizontal axis of rotation, in particular, and the jib is mounted in particular on the rocker arm so that it can swivel about another horizontal axis of rotation, in particular. Thus, the robotic arm of this variant does not have any roundtable, i.e., a so-called axis 1, running vertically. A rotation of the passenger compartment with respect to a vertically running axis can in fact be realized thanks to the omnidirectionally movable carrier vehicle of the flight simulator device of the invention, so that this variant enables a flight simulation in six degrees of freedom.

According to another variant of the flight simulator device of the invention, the device for raising and lowering the passenger compartment has a supporting device, rigidly fastened to the carrier vehicle, on which the robotic arm is mounted so that it can turn about a horizontally running axis of rotation. Preferably, the robotic arm then has precisely three degrees of freedom. In particular, according to this variant, the robotic arm can have a jib and a robotic hand, especially a multiaxial one, wherein the jib is mounted on the supporting device so that it can swivel about a horizontal axis of rotation. The vertical movements that are needed for a simulated takeoff and landing can be performed about the horizontal axis of rotation, relative to which the jib is mounted on the supporting device. Simulated rolling and pitching movements of the passenger compartment are realized via the manual axes of the robotic hand. With this reduced robotic arm, one can save on weight and therefore a smaller carrier vehicle can be used, for example.

The flight simulator device of the invention can have a rechargeable battery as the electrical power source.

The flight simulator device of the invention can be operated, e.g., in a hall with roughly 30×40 m surface, for example. For flexibility, and to confine the movements of the invented flight simulator device as little as possible, a power supply for the invented flight simulator device can be arranged in the middle of the hall ceiling via a movable boom and a hoist chain running downward, e.g., via a hose assembly on the robotic arm or the carrier vehicle. Thus, the flight simulator device of the invention can have a power supply mounted on a ceiling to power the control device and the carrier vehicle with electrical energy.

Another aspect of the invention concerns a flight simulator system having the flight simulator device of the invention, a projection surface for projecting a picture or a film, and a projector that is connected to the control device, designed to project the picture or the film onto the projection surface under control from the control device. In this way, the simulated flight can be enhanced with appropriate scenery.

Figure 2:
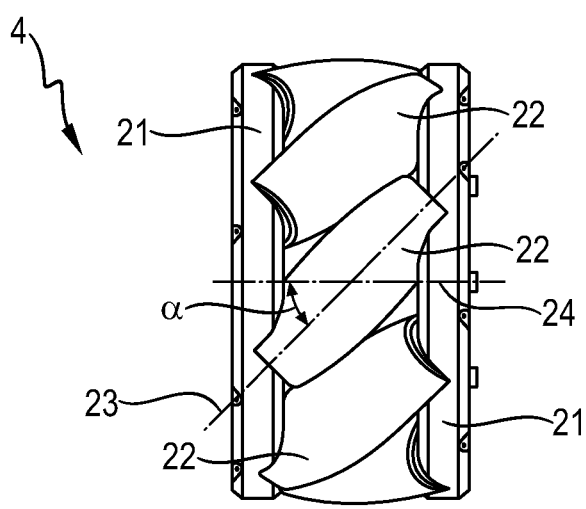
Figure 3:
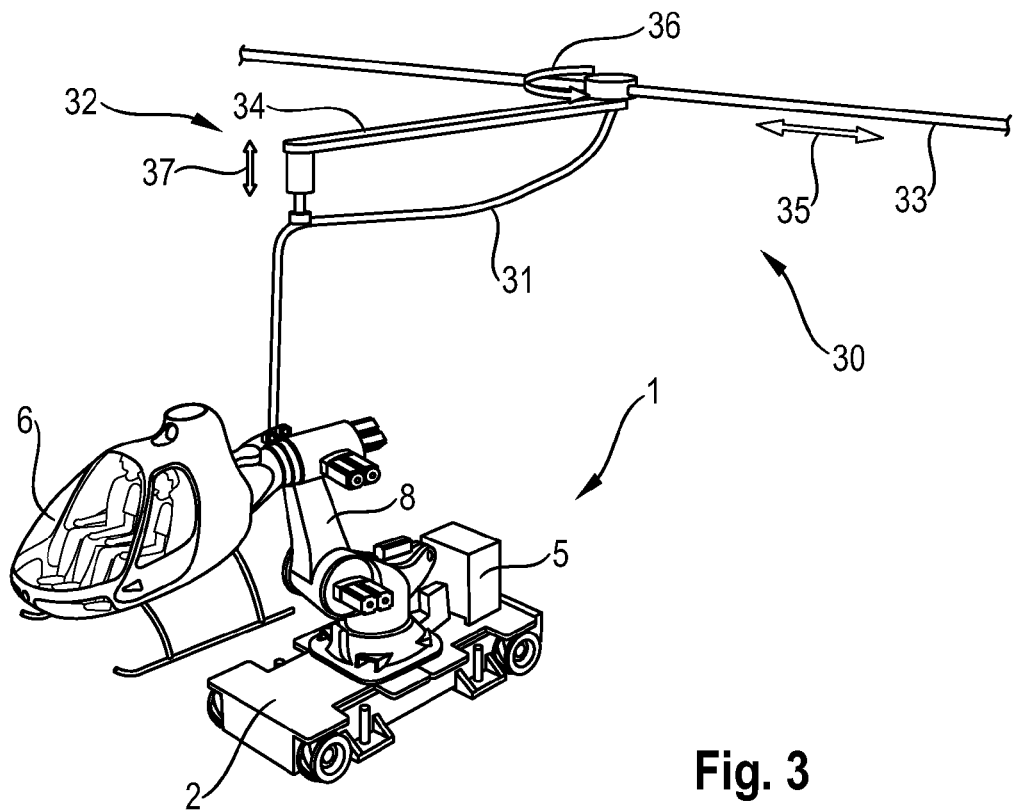
Figure 4:
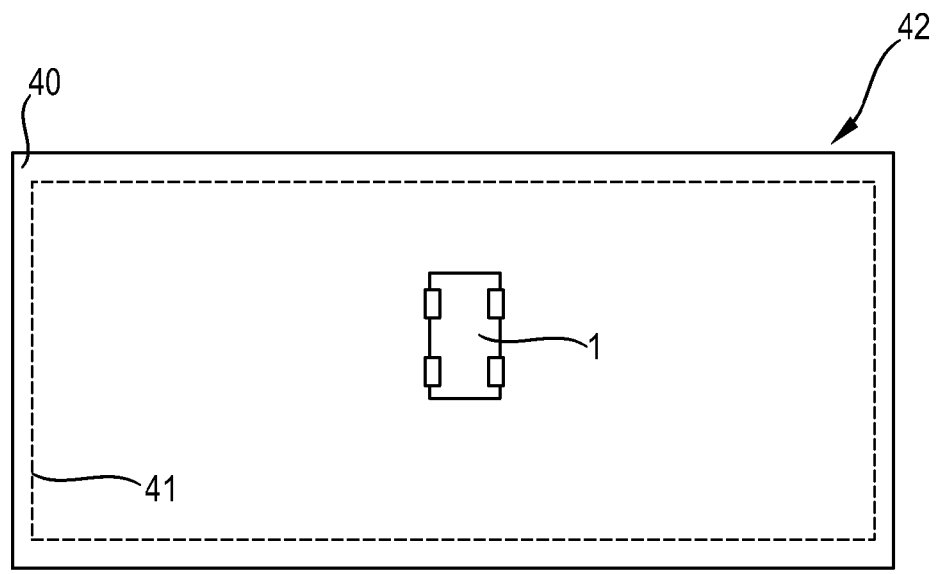
Figure 5:
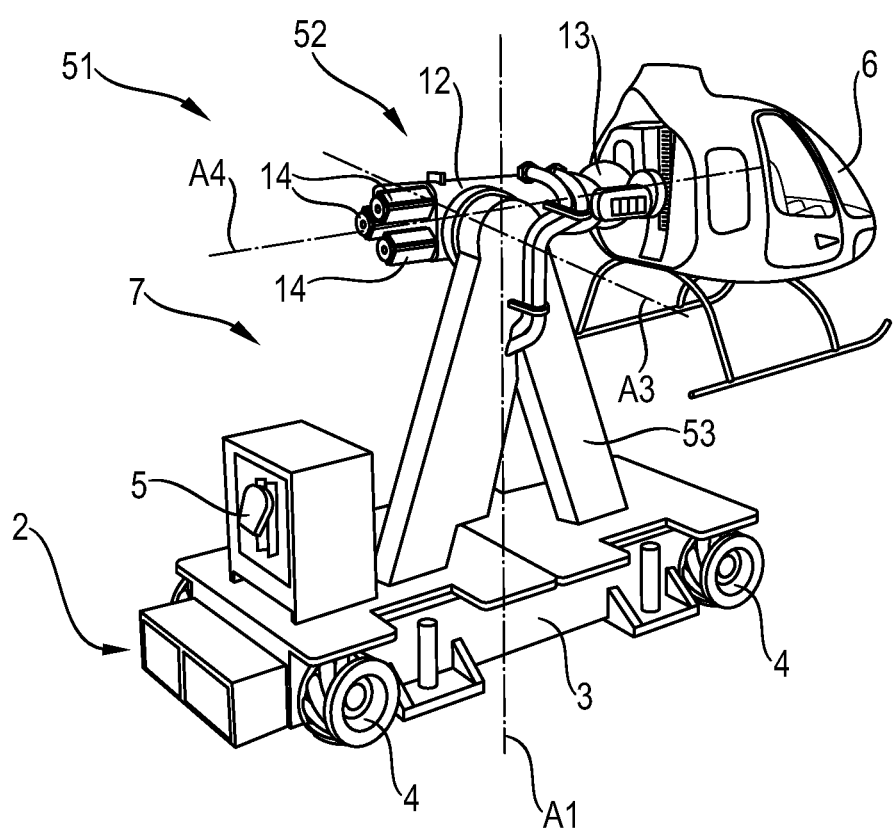

Sample embodiments of the invention are shown for illustration in the appended schematic drawings. There are shown:

FIG. 1, a flight simulator device with an omnidirectional carrier vehicle and a robotic arm, FIG. 2, an omnidirectional wheel, FIG. 3, an external power supply for the flight simulator device, FIG. 4, a flight simulator system with the flight simulator device, FIG. 5, another flight simulator device.

FIG. 1 shows a flight simulator device 1 which is designed to afford the opportunity to simulate the flight behavior of an aircraft for at least one person P. This makes it possible for the person P to learn the flight behavior without making use of the aircraft being simulated, e.g., for training purposes. The flight simulator device 1 is designed, in particular, to simulate the flight behavior of a rotary-wing aircraft, such as a helicopter.

In the case of the present sample embodiment, the flight simulator device 1 has an omnidirectionally movable carrier vehicle 2. This comprises, e.g., a vehicle base body 3 and several wheels 4 rotatably arranged about the vehicle base body 3, being designed as omnidirectional wheels. In the case of the present sample embodiment, the carrier vehicle 2 has four omnidirectional wheels 4. At least one of the wheels 4, preferably all wheels 4, is or are driven by one or more drive units. The drive units, not further illustrated, are preferably electric drive units, especially regulated electric drive units, and they are connected to a control device 5, for example, one arranged in or on the vehicle base body 3, which is designed to move the carrier vehicle 2 by appropriate actuation of the drive units for the wheels 4.

An example of an omnidirectional wheel is the so-called Mecanum wheel. A wheel 4 of the flight simulator device 1 or its carrier vehicle 2 that is designed as an omnidirectional wheel is shown in front view in FIG. 2.

The wheel 4 designed as an omnidirectional or Mecanum wheel in the case of the present sample embodiment has two rigidly joined together wheel disks 21, between which are mounted several rollers 22 that are able to turn with respect to their longitudinal axis 23. The two wheel disks 21 can be mounted able to turn with respect to an axis of rotation 24 and be driven by means of one of the drive units of the carrier vehicle 2 such that the two wheel disks 21 turn with respect to the axis of rotation 24.

In the case of the present sample embodiment, the rollers 22 are uniformly spaced apart and mounted on the wheel disks 21 such that their rolling surfaces project out beyond the circumference of the wheel disks 21. Furthermore, the rollers 22 are mounted on the wheel disks 21 such that their longitudinal axes 23 make an angle a of 45°, for example, with the axis of rotation 24.

Thanks to the omnidirectional wheels 4, the flight simulator device 1 or its carrier vehicle 2 is able to move freely in space. Thus, the carrier vehicle 2 can not only move forward, backward, or sideways, or travel curves, but also turn about, say, a vertically oriented axis A1.

The flight simulator device 1 moreover has a passenger compartment 6 to accommodate the person P. This comprises, e.g., a seat, on which the person P sits during a flight simulation carried out by means of the flight simulator device 1, and input means. In particular, the passenger compartment 6 is modeled on the pilot's position of the aircraft or rotary-wing aircraft whose flight behavior is being simulated. Thus, in particular, the input means of the passenger compartment 6 are modeled on the operating instruments of the aircraft being simulated. The passenger compartment 6 can also have all other instruments available to the aircraft being simulated, in order to mimic the flight behavior of this aircraft as accurately as possible. The input means or instruments of the passenger compartment 6 are connected to the control device 5.

In order to simulate a raising and lowering of the aircraft, for example, the flight simulator device 1 has a device 7 for raising and lowering the passenger compartment, especially along the axis A1. This is fastened to the carrier vehicle 2, especially to its vehicle base body 3. This device 7, to which the passenger compartment 6 is fastened, comprises a drive unit, especially an electric drive unit, preferably a regulated electric drive unit, which is connected to the control device 5. On the control device 5, in turn, runs a computer program, which actuates this drive unit based on the signals arriving from the input means of the passenger compartment 6 so that the passenger compartment 6 is moved by means of the device 7 for raising and lowering the passenger compartment such that the passenger compartment 6 is raised and lowered as desired by the person P. The device 7 for raising and lowering the passenger compartment is configured, e.g., as a hoisting device, a vertically running linear axle, or a hexapod.

In the case of the present sample embodiment, the device 7 for raising and lowering the passenger compartment is also configured such that the passenger compartment 6 can turn relative to an axis A4. In addition or alternatively, the device 7 for raising and lowering the passenger compartment is configured so that the passenger compartment 6 can swivel and/or tilt.

In the case of the present sample embodiment, the device 7 for raising and lowering the passenger compartment is configured as a robotic arm 8, which is fastened on the carrier vehicle 2 or its vehicle base body 3.

The robotic arm 8 comprises in the case of the present sample embodiment several members arranged in succession and connected by means of joints. The members in particular are a frame 9, by means of which the robotic arm 8 is fastened to the vehicle base body 3.

The robotic arm 7 has, as another member, a carousel 10, mounted so that it can rotate about the vertically running axis A1 relative to the frame 9, for example. Since the carrier vehicle 2 can turn about the vertically running axis A1, in the case of the present sample embodiment the robotic arm 8 is configured such that the carousel 10 is rigidly connected to the frame 9 or the robotic arm 8 does not have a carousel 10.

Additional members of the robotic arm 8 in the case of the present sample embodiment are a rocker arm 11, a jib 12 and a robotic hand 13, preferably a multiaxial one, with a fastening device configured as a flange, for example, to fasten the passenger compartment 6. The rocker arm 11 is mounted at the lower end, e.g., on a rocker arm bearing head (not otherwise shown) on the carousel 10 or the frame 9 and able to swivel about a preferably horizontal axis of rotation A2. At the upper end of the rocker arm 11, the jib 12 is mounted and able to swivel in turn about a likewise preferably horizontal axis A3. At its end, the jib carries the robotic hand 13 with its preferably three axes of rotation (manual axes), of which only the axis A4 is shown for sake of clarity in FIG. 1. The robotic arm 8 is thus movable with respect to five axes in the present sample embodiment.

The robotic arm 8 moreover comprises drive units connected to the control device 5. The drive units in the case of the present sample embodiment are electric drive units, especially regulated electric drive units. In FIG. 1, only a few of the electric motors 14 of these drive units are shown. The robotic arm 8 and the control device 5 are designed especially as standard industrial robots, being secured to the carrier vehicle 2.

In the operation of the flight simulator device 1 the person P operates the input means of the passenger compartment 6. These generate signals, especially electrical signals, which the control device 5 processes and thereupon actuates the drive units of the robotic arm 8 and the drive units of the carrier vehicle 2 so that the passenger compartment 6 performs a movement corresponding to the input of the person P to simulate the flight behavior of the aircraft being simulated.

For an electrical power supply of the flight simulator device 1, this can have at least one rechargeable battery 15, which is arranged, e.g., in or on the vehicle base body 3 of the carrier vehicle 2.

In the case of the present sample embodiment, the flight simulator device 1 has an external power supply 30, shown in FIG. 3. This is arranged, e.g., on a ceiling of a hall 40, shown in FIG. 4, in which the flight simulator device 1 is set up. The external power supply 30 is secured, in particular, in the middle of the ceiling of the hall 40.

The external power supply 30 comprises in particular an electrical cable 31, which is connected, e.g., to the robotic arm 8. By the cable 31, the flight simulator device 1 can be powered with electric energy or an electric voltage.

The external power supply 30 comprises in the case of the present sample embodiment a supporting device 32 for supporting the cable 31. The supporting device 32 comprises, e.g., a boom 34 moved by a hoist chain 33 by which the cable 31 is guided. The boom 34 can move along the hoist chain 33 along a double arrow 35. The boom 34 can rotate, e.g., with respect to an arrow 36. At one of its ends, the cable 31 is secured to the boom 34. This end can be configured so that the cable 31 can move along a double arrow 36.

In the case of the present sample embodiment, at least one of the walls of the hall 40, preferably all walls of the rectangular hall 40 (for example), are provided with a projection surface or configured as a projection wall 41. In this way, it is possible to project pictures of a simulated environment for the simulated flight onto the wall of the hall 40 that is designed as a projection wall 41. These pictures are projected, e.g., by means of a projector, not otherwise shown, onto the projection wall 41. The projector is connected, e.g., to the control device 5, in order to be actuated by the latter. A communication link between the control device 5 and the projector is realized wirelessly, for example. But the communication link can also be via the external power supply 30, e.g., via an additional signal line laid next to the cable 31 with the supporting device 32. The hall 40 with the projection wall 41 and the flight simulator device 1 form a flight simulator system 42.

FIG. 5 shows another flight simulator device 51. Unless otherwise specified, components of the flight simulator device 51 shown in FIG. 5 that are basically identical in form and function to components of the flight simulator device 1 shown in FIG. 1 are given the same reference numbers.

The two flight simulator devices 1, 51 differ basically in their device 7 for raising and lowering the passenger compartment.

Although this device 7 also comprises a robotic arm 52 with several members arranged in succession, unlike the robotic arm 8 of the flight simulator device 1 shown in FIG. 1 the robotic arm 52 of the flight simulator device 51 shown in FIG. 5 has no frame, no carousel and no rocker arm. The robotic arm 52 comprises basically only the jib 12 and the preferably multiaxial robotic hand 13 with the fastening device, designed as a flange for example, for the fastening of the passenger compartment 6.

The device 7 for raising and lowering the passenger compartment of the flight simulator device 51 moreover comprises a supporting device 53, rigidly connected to the carrier vehicle 2 or its vehicle base body 3, at whose upper end is mounted the robotic arm 52 or its jib 12 in order to swivel about a preferably horizontal axis A3. This carries at one end the robotic hand 13 with its preferably three axes of rotation (manual axes), of which only the axis A4 is shown in FIG. 5 for sake of clarity. The robotic arm 52 is thus movable with respect to four axes in the case of the present sample embodiment.

The invention claimed is:

1. Flight simulator device for simulating the flight behavior of an airplane, especially a rotary-wing aircraft, the flight simulator device comprising:
   a passenger compartment with an input means and accommodating at least one person,
   an omnidirectionally movable carrier vehicle with several wheels and with drive units for driving the wheels,
   a control device in communication with the input means and the drive units of the carrier vehicle, the control device actuating the drive units of the carrier vehicle on the basis of signals coming from the input means, and
   a device fastened to the carrier vehicle for raising and lowering the passenger compartment, the device comprising:
      a drive unit connected to the control device, wherein the control device actuates the drive unit of the device for raising and lowering the passenger compartment based on signals received from the input means,
      a robotic arm, which includes a plurality of links arranged in succession and drive units connected to the control device for moving the links, the robotic arm having precisely three degrees of freedom, and
      a supporting device rigidly fastened to the carrier vehicle, the robotic arm mounted on the supporting device so that the robotic arm can turn about a horizontally running axis of rotation.

2. Flight simulator device according to claim 1, wherein the wheels of the carrier vehicle are configured as omnidirectional wheels.

3. Flight simulator device according to claim 1, wherein the device for raising and lowering the passenger compartment is designed to rotate, to tilt, and/or to swivel the passenger compartment.

4. Flight simulator device according to claim 1, wherein the robotic arm comprises a jib and a multiaxial robotic hand, and wherein the jib is mounted on the supporting device so that it can swivel about the horizontal axis of rotation.

5. The flight simulator device of claim 4, wherein the robotic hand has three axes.

6. Flight simulator device according to claim 1, having a power supply mounted on a ceiling to power the control device and the carrier vehicle with electrical energy.

7. Flight simulator system, having a flight simulator device according to claim 1, further comprising a projection surface for projecting a picture or a film, and a projector that is connected to the control device, designed to project the picture or the film onto the projection surface under control from the control device.

8. A flight simulator device for simulating the flight behavior of an aircraft, especially a rotary-wing aircraft, the flight simulator device comprising:
 a passenger compartment accommodating at least one person, the passenger compartment including an input means;
 an omnidirectionally movable carrier vehicle including a plurality of wheels and corresponding drive units for driving the wheels;
 a control device connected to the input means and the drive units of the carrier vehicle, which is designed to actuate the drive units of the carrier device on the basis of signals received from the input means; and
 a device fastened to the carrier vehicle for raising and lowering the passenger compartment, the device comprising:
  a drive unit connected to the control device, wherein the control device is designed to actuate the drive unit of the device for raising and lowering the passenger compartment based on signals arriving from the input means, and
  a robotic arm including a plurality of links arranged in succession and drive units in communication with the control device for moving the links, the robotic arm being moveable with respect to four axes.

9. The flight simulator device of claim 8, wherein the wheels of the carrier vehicle are configured as omnidirectional wheels.

10. The flight simulator device of claim 8, whose device for raising and lowering the passenger compartment is designed to rotate, to tilt, and/or to swivel the passenger compartment.

11. The flight simulator device of claim 8, having a power supply mounted on a ceiling to power the control device and the carrier vehicle with electrical energy.

12. A flight simulator system, comprising:
 a flight simulator device according to claim 8;
 a projection surface for receiving a projected picture or film; and
 a projector communicating with the control device, the projector designed to project the picture or film onto the projection surface under control of the control device.

* * * * *